Jan. 7, 1964    W. W. PALM    3,116,876
HOT WATER HEATING SYSTEM
Filed May 19, 1960    3 Sheets-Sheet 1

INVENTOR.
WILLIAM W. PALM
BY
*Bruner, Smith & Harding*
ATTORNEYS

*INVENTOR.*
WILLIAM W. PALM
BY
ATTORNEYS

United States Patent Office 3,116,876
Patented Jan. 7, 1964

3,116,876
HOT WATER HEATING SYSTEM
William W. Palm, Yellowsprings and Wells Road,
R.D. 1, Malvern, Pa.
Filed May 19, 1960, Ser. No. 30,160
27 Claims. (Cl. 237—8)

The invention relates to hot water heating systems, and more particularly to the elimination of the various circulating pumps usually necessary in such systems.

This application is a continuation in part of my application Serial No. 840,969, filed September 18, 1959 and now abandoned. In that application I have disposed a system for supplying feedwater to a boiler and which replaces the ordinary feedwater pumps. Briefly, in that system the boiler is continuously or intermittently supplied with water from a reservoir tank. A second tank automatically fills itself and discharges water to the reservoir tank, the filling of the second tank being accomplished by the condensation of steam therein to produce a vacuum. In addition to the various obvious advantages in eliminating the need for conventional pumps, the above system has advantages in connection with deaeration, feedwater heating, reduction in boiler scale and sediment, and automatic control.

There is presently a growing interest in and trend to high temperature water (HTW) systems, and although the system according to the present invention may operate at medium or low temperatures, it is an object of the invention to provide a system that is particularly suited to high temperature operation. Water over 300° F. generally is defined as high temperature water, while water between 212° and 300° F. and over 55 p.s.i.g. is considered medium temperature. An average high temperature water system may operate at 375° F. and 150 to 160 p.s.i.g. Instead of the usual 20° F. system temperature drop, a high temperature water system may have a 100° to 150° F. differential. The interest in high temperature water is attributable to its many advantages over steam or medium-low temperature water systems and these advantages are well-known. Briefly, however, steam traps and pipe grading are not required, heat distribution is simple and flexible, feedwater treatment problems are negligble, and boiler size is reduced.

Problems arise in high temperature water systems in regard to circulating pumps mainly because the water is near saturation temperature and pressure. Thus the water tends to flash, particularly at the pump intakes, resulting in cavitation. Such problems are somewhat minimized in practice by placing the circulating pumps at a low point or in the return circuit of the system, or by blending or mixing return water with the high temperature water to reduce the temperature of the latter. Such design precautions, however, are not always observed, possibly due to cost considerations or design limitations. It will be understood that in a typical hot water system many pumps are necessary, and even in a medium temperature system pumps must be staged to minimize cavitation. Even further, particularly in high temperature systems, both heating circuit and boiler circulating pumps often are required. Such pumps are expensive both in initial and operating costs, and obviously it would be advantageous to eliminate the need for them.

One of the most troublesome problems involved in hot water system operation is the deaeration, softening, and other treatment of feedwater. Water treatment apparatus and the operating costs thereof represent considerable expenses which frequently are prohibitive, particularly in small systems. This problem is aggravated because, ordinarily, makeup requirements are high due, as examples, to gland leakage in the pumps and to blowdown.

The invention according to the present application relates to an advanced hot water system for operation in the maximum high temperature water range (presently around 400° F.) as well as at low and medium temperatures, and wherein the circulation through the system and the boiler is induced automatically by means other than the customary pumps.

Briefly, the pumping action is provided by the condensation of steam in a tank to lower the pressure therein and thereby draw water from the primary heating return circuit. The water in this "pumping tank" is intermittently discharged, by combined steam pressure and gravity, into a reservoir tank wherein the water is heated by direct contact with steam. In a high temperature system this water may be heated almost to its saturation temperature, which will be very high since the water is under a high pressure corresponding to the steam pressure. The reservoir tank serves not only as a source for the intermittent or continuous supply of water to the boiler, but also, in a limited sense, as an expansion tank. From the reservoir tank water is forced through the primary heating circuit at the steam pressure, which, as implied above, may be only slightly greater than the saturation pressure of the heated water. Various arrangements disclosed herein, including the provision of a direct contact type, or cascade, heat exchanger, are employed in the reservoir tank for the direct heating of water by steam. It will be understood that the above brief description is illustrative only, and that various variations are comtemplated as described hereafter and within the scope of the claims.

A system according to the invention is completely closed, and makeup water requirements are eliminated or reduced to the point where deaeration and chemical treatment is no longer a problem. Any deaeration or treatment that is deemed necessary may be effected within the system without the necessity of providing auxiliary special equipment. Heretofore, high temperature water systems have been restricted in application to very large installations, particularly military, but the present invention opens the way for high temperature water in small and medium size installations.

One advantage of the invention disclosed herein is that, with the elimination of the usual electric pumps, the installation of the hot water system is not limited by the availability or susceptibility to failure of electric power in certain remote geographical areas.

Further objects and advantages will become apparent from the following description, read in conjunction with the accompanying drawings, in which.

Figure 1:
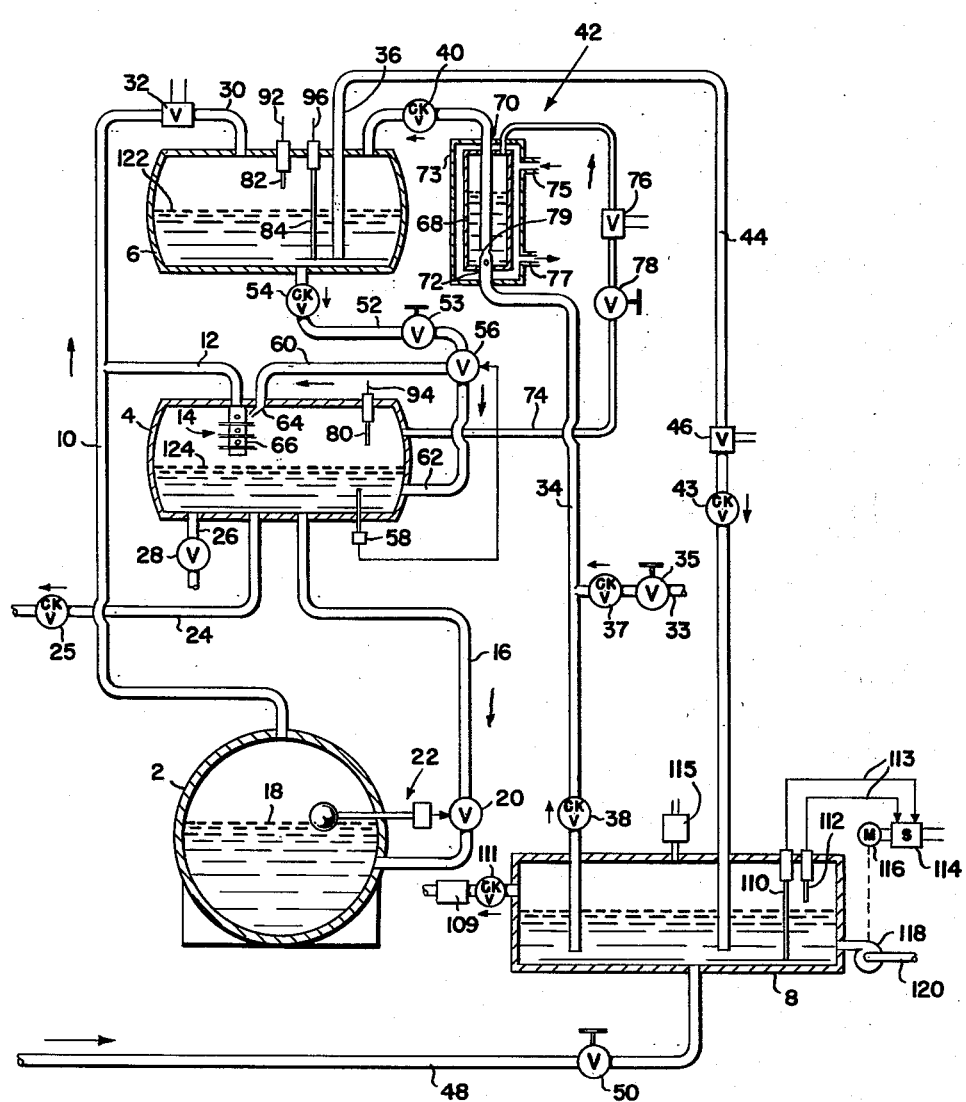
FIGURE 1 is a schematic diagram illustrating a first heating system according to the invention.

Referring to FIGURE 1, the principal parts of the system are a boiler 2, reservoir tank 4, pumping tank 6 and return tank 8. A riser 10 extends upwardly from above the water level in the boiler and a branch 12 of the riser 10 communicates with the space within reservoir tank 4 via a direct contact or cascade type heat exchanger 14, discussed more fully hereafter. From the bottom of supply tank 4 (or in any case from below the water level therein), a line 16 extends downwardly to the boiler 2 at a point below the water level 18. A valve 20 interposed in line 16 is operated by a float actuated control 22, the valve 20 being opened when the water level 18 falls below a predetermined height. From what has been described thus far it will be evident that due to the approximately equal steam pressures in the upper spaces of boiler 2 and supply tank 4, water will flow by gravity from tank 4 to boiler 2 when valve 20 is opened.

A line 24, provided with a check valve 25, leads from below the water level in supply tank 4 to what will be referred to hereafter as the "primary heating circuit." Tank 4 also has an outlet 26 having a valve 28 therein for purposes of draining and cleaning, as mentioned hereafter.

An upper branch 30 of riser 10 is connected to the upper space of pumping tank 6 and has a solenoid valve 32 interposed therein. A riser 34 extends upwardly from below the water level in return tank 8 to the upper space of pumping tank 6, and is provided with a pair of check valves 38 and 40 at the opposite sides of a pressurizing unit 42 that will be described hereafter. A high pressure water line 33 having a hand valve 35 and check valve 37 therein is tapped into riser 34 for purposes described hereafter. A further line 44 extends upwardly from below the water line in return tank 8 and has a downwardly extending loop 36 terminating below the water line in pumping tank 6, a check valve 43 and a solenoid valve 46 being provided in the line 44. The return line from the primary heating circuit is indicated at 48 and has a throttling valve 50 therein.

A line 52 having a check valve 54 therein extends downwardly to a valve 56 which is controlled by a thermostatic element 58. Valve 56 is of the bypass type which, depending upon the temperature sensed by thermostatic element 58, proportions the flow from line 52 between a branch 60 leading to the heat exchanger 14 and a branch 62 discharging below the water line in tank 4. Cascade type heat exchangers such as 14 are well-known and generally comprise a plurality of plates of large surface area against which water is discharged as at 64, preferably in a fine spray, to directly contact steam emanating from ports such as 66. Preferably, although not shown, the water is discharged at a plurality of points against the surface areas of the heat exchanger. The principle of operation of direct contact heat exchanger 14 is to utilize the heat of vaporization of steam to bring the water to a high temperature.

The pressurizing unit 42 comprises a closed shell 68 surrounding riser 34, which passes through the walls of shell 68 and is sealed, for example by welding, at 70 and 72. A line 74 connects the upper interior space of shell 68 with the upper interior space of tank 4, line 74 having a solenoid valve 76 and a throttling valve 78 interposed therein. It will be noted that ports 79 are provided in riser 34, thereby permitting the interchange of liquid between shell 68 and riser 34. Unit 42 also includes a jacket 73 surrounding shell 68 and having inlet and outlet lines 75 and 77, respectively. Cold water supplied from a high pressure line and entering at 75 is thereby in heat exchange contact with shell 68 for the cooling of water therein.

Figure 2:
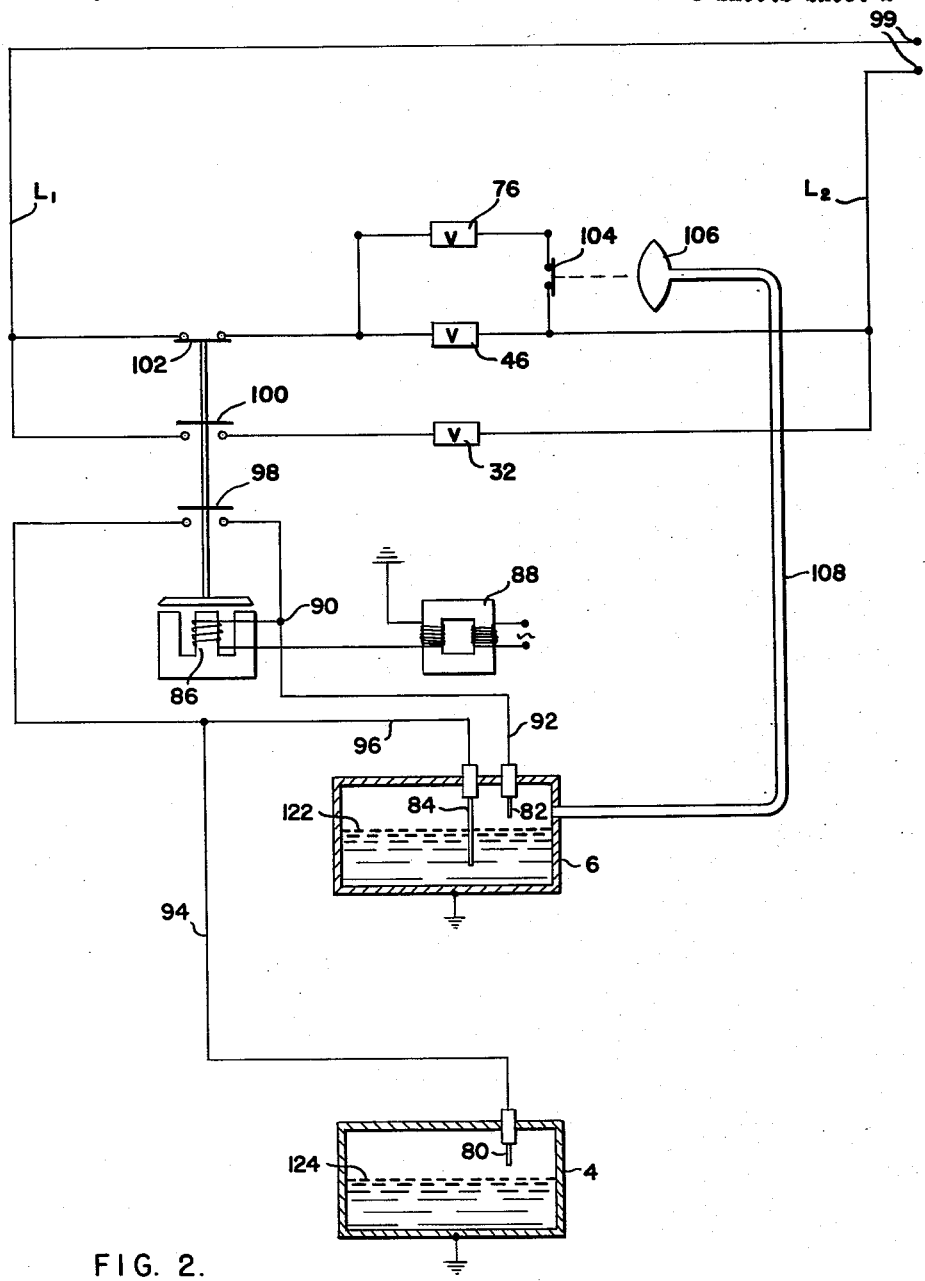
FIGURE 2 is a wiring diagram of the controls provided for the system according to FIGURE 1.

A probe 80 extends downwardly into reservoir tank 4 and probes 82 and 84 extend downwardly into pumping tank 6, as shown. These probes 80, 82 and 84, are of a type well-known, which comprises an electrode which conducts electricity through water in contact therewith. Referring to FIGURE 2, the coil 86 of a conventional alternating current relay is adapted to be energized from a transformer 88 connected to an alternating current source, and has a terminal 90 to which the probe 82 is directly connected through line 92. Probes 80 and 84, through lines 94 and 96, respectively, are connected in parallel with each other and in series with a switch 98, and are thereby adapted to be connected to the terminal 90. A pair of leads L1 and L2 are connected to the terminal 99 of a direct or alternating current source. Valve 32 is a conventional solenoid operated valve which is normally closed and is opened when energized. Solenoid valve 32 is connected across lines L1 and L2 in series with switch 100. Valves 76 and 46 are conventional solenoid valves, and are connected across lines L1 and L2 in series with switch 102. Valves 76 and 46 are normally closed, and are opened upon energization thereof. It will be noted that a further switch 104 is interposed between solenoid valve 76 and the line L2. Switch 104 is operated by a pressure responsive bellows 106, the interior of which communicates with the upper space of pumping tank 6 via a line 108. It should be understood that switch 104 is normally closed, but that upon a drop to a predetermined pressure in tank 6, bellows 106 will open switch 104 and hold it open until the pressure in tank 6 is restored. The switches 98, 100 and 102 of the relay are ganged and are shown, in FIGURE 2, in the positions which they occupy when the relay coil 86 is deenergized.

Valve 32 has been described as being of the solenoid-operated type. However, as described more fully hereafter, whereas a solenoid valve may be satisfactory in a relatively small system, in a large system wherein the riser 10 carrying high pressure steam would be of large diameter a motorized valve preferably is employed. Also, as described hereafter, to insure against flashing in reservoir tank 4 and in the heating circuit upon opening of valve 32, it is desirable to provide in the riser 10 a modulating type valve governed by the pressure in tank 4.

Return tank 8 is provided with a pair of probes 110 and 112 which are similar to the probes 80, 82 and 84 previously described. Through lines of control schematically indicated at 113, probes 110 and 112 actuate a switch 114 for turning on and off an electric motor 116 for driving a pump 118. Pump 118 is provided to supply makeup water to tank 8 from a supply line 120, it being understood that motor 116 will be operative when the water level falls below probe 110 and inoperative when the water level rises to probe 112. In a closed system as disclosed, operating at high temperature, however, the makeup requirements tend to be extremely small and less elaborate means for supplying makeup water may be satisfactory. Return tank 8 is provided with a steam trap 109, preceded by a check valve 111, for draining water from the tank when the water level therein rises above a predetermined maximum level. An air vent 115 also is provided.

The operation of the apparatus described thus far will now be described. Begin with the water levels 122 and 124 in tanks 6 and 4, respectively, at the heights shown in FIGURE 1. Assume that solenoid valve 32 is energized and open, and that solenoid valves 76 and 46 are deenergized and closed. (The relay coil 86 will then be energized, switches 98 and 100 will be closed, and switch 102 will be open.) Steam is being bled through riser branches 30 and 12 to tanks 6 and 4 and, due to the equalization of pressures in the tanks, water is flowing by gravity from tank 6 downwardly through lines 52 and 60 and discharging at 64 against the plates of heat exchanger 14. Due to the mixing of steam and water at heat exchanger 14, the water in tank 4 will be heated, possibly to its saturation temperature at the pressure of the steam. Meanwhile, valve 20 is operated by the float actuated control 22, the operation of valve 20 being such that it opens to permit the flow of water by gravity from tank 4 to boiler 2 as long as the water level 18 in boiler 2 remains below a predetermined height.

Water at a high temperature, of say over 300° F., flows to the heating circuit through line 24 and returns through line 48 to return tank 8. Reference has been made to the "primary heating circuit," and this may be explained by the fact that it is typical in high temperature water systems to employ converters (heat exchangers) wherein high temperature water in a primary circuit heats water in a secondary circuit which may include, for example, space heaters. In other instances steam for various processes may be produced in the secondary circuit, or the high temperature water may be utilized directly.

In any case, the water returning through line 48 will be at a temperature possibly up to 150° F. less than the high temperature water supplied from tank 4, and the pressure in return tank 8 will be much lower than the initial pressure. Summarizing, water flows from tank 6 by gravity to the heat exchanger 14, where it mixes with steam and is thereby heated to a high temperature. This water then flows, at the pressure of steam in tank 4, through supply line 24 to the destination where it will be utilized in heat exchange equipment for space or process heating purposes, and thence through return line 48 to return tank 8.

The temperature of the water supplied through line 24 is controlled by the valve 56. If thermostatic element 58 senses a water temperature in reservoir tank 4 higher than desired, valve 56 will divert a portion of the water flowing in line 52 away from the heat exchanger 14, whereby an amount of relatively cool water enters tank 4 at 62. If thermostatic element 58 senses a water temperature lower than desired, valve 56 will direct most or all of the water flowing downwardly in line 52 to the heat exchanger 14.

When the supply of water in pumping tank 6 is exhausted, that is, when the water level 122 falls below the lower end of probe 84, the probe (or electrode) 84 will cease to conduct electricity. Recalling that at the beginning of the described operation relay coil 86 was energized, it should be evident that the emptying of pumping tank 6 below the end of probe 84, alone, will not effect the deenergization of coil 86. Rather probe 80 and line 94 constitute, in effect, a holding circuit. Even through water level 122 falls below probe 84, if the water level 124 in reservoir tank 4 does not fall below probe 80, a complete circuit will be maintained through the water in tank 4, line 94, switch 98, and relay coil 86, and the coil 86 will not, therefore, be deenergized to place the circuit elements in the condition illustrated in FIGURE 2. However, when pumping tank 6 is emptied, accompanied by the water level 124 in tank 4 falling below probe 80, relay coil 86 will be deenergized and switches 98 and 100 will open and switch 102 will close. Upon the opening of switch 100 solenoid valve 32 deenergizes and closes, and upon the closing of switch 102 solenoid valves 46 and 76 energize and open. It will be understood that prior to the closing of valve 32, steam was flowing therethrough from boiler 2 to pumping tank 6. Therefore, at this stage as valve 32 closes, pumping tank 6 contains a large quantity of steam. Steam flows from reservoir tank 4 through the now open valve 76 to the interior of shell 68. The pressure of steam acting on the surface of water remaining in the shell 68 from the previous pumping cycle, through the orifices 79, forces water in shell 68 and riser 34 upwardly through check valve 40 to discharge the water into pumping tank 6. It should be understood that due to the heat exchange brought about by the cold water circulating within the jacket 73, the water now discharged into tank 6 is at a far lower temperature than that of the steam therein. Accordingly, a rapid condensation of steam takes place in tank 6. Concurrently with this condensation, due to the now open condition of solenoid valve 46, the steam in tank 6 will be exhausted to the lower pressure of return tank 8 and air and non-condensable gases also will escape. This net result is the lowering of the pressure in pumping tank 6 below the pressure in return tank 8, it being noted that when the pressure in tank 6 drops approximately to the pressure of tank 8 a reversal in the flow of vapor or liquid upwardly in riser 44 is blocked by check valve 43. After a considerable drop in pressure in tank 6 is sensed by bellows 106, switch 104 is opened, thereby deenergizing and closing solenoid valve 76. By virtue of the reduced pressure in tank 6 water continues to flow from return tank 8 upwardly through riser 34 to fill pumping tank 6. Some flow of water through ports 79 and into shell 68 is permitted due to the cooling of the space within the shell 68, this relatively small portion of water being stored in readiness for initiation of the next cycle of pumping. The filling of tank 6 continues until the water level 122 rises to the probe 82, whereupon a circuit is again completed through probe 82, line 92 and relay coil 86, the latter being thereby energized to close switches 98 and 100 while opening switch 102. In the meantime, the water level 122 also has re-established contact wtih probe 84, and upon the closing of switch 98 a holding circuit is established which will hold in relay coil 86 even upon the subsequent drop in level 122 below probe 82. Upon the closing of switch 100 solenoid valve 32 is reenergized and thereby opened, resuming the flow of steam through branch 30 into tank 6. The opening of switch 102 deenergizes and closes valve 46. The high pressure steam now entering tank 6 will cause bellows 106 to close switch 104, but due to the now open condition of switch 102 solenoid valve 76 cannot be reenergized and will therefore remain closed. With the resumption of steam pressure in tank 6, the pressures in tanks 4 and 6 will again be equalized, permitting the flow of water by gravity to tank 4.

It will be evident from the above disclosure that tank 6 operates in two stages, the one involving the emptying of water therefrom into tank 4, and the other involving a pumping action to replenish the supply of water in tank 6 by drawing water from the return tank 8. The pumping cycle of tank 6 is not initiated until two conditions have occurred, the first being the emptying of tank 6 below the probe 84, and the second being that the water level 124 in reservoir tank 4 is below the probe 80. It must be noted that the supply of water from reservoir tank 4 to the primary heating circuit continues regardless of whether the tank 6 is in its pumping or emptying stage of operation. In other words, tank 6 intermittently replenishes the supply of water in tank 4, but reservoir tank 4 may nevertheless supply water to the primary heating circuit continuously. It should be noted that the provision of probe 80 is not necessary, but is preferable in installations wherein the heating or "demand" load may fluctuate considerably. However, by the provision of probe 80, if tank 4 is substantially full of water at the time that tank 6 becomes empty, the pumping action of pump 6 will not begin until the water level in tank 4 falls below probe 80. This pumping action is, of course, then initiated by the interruption of a circuit through probe 80, line 94, switch 98 and relay coil 86. The rate of discharge of water from tank 6 through line 52 may be regulated by adjustment of valve 53 and this, combined with the effects of probe 80, insures that there will always be a vapor space above the water level 124, which space is desirable for technical and safety reasons.

Water line 33 and valve 35 are provided for the purpose of starting the system when it is cold, for example after a weekend or other period during which the system was shut down. To start the system with the pumping tank 6 in its emptying rather than pumping stage, valve 35 is opened manually to permit water under pressure to flow upwardly through riser 34 and into tank 6 until the water level 122 therein rises to probe 82, on which occurrence relay coil 86 will be energized, resulting, as previously described, in the opening of valve 32 and the closing of valves 46 and 76. Steam from the boiler then enters tank 6 and immediately starts the supply of water to reservoir tank 4. Therefore, there is no danger that sufficient water will not be present in reservoir tank 4 to supply the boiler. The valve 35, of course, is manually or automatically closed after a sufficient amount of water has entered tank 6 to raise the level to probe 82. An alternative of the above arrangement used in cold starting may be employed, and involves the provision of a pump to pump water from return tank 8 into tank 6. By suitable piping and valves the pump 118 may be used for this purpose. In connection with the above matter, it should be noted that there is disclosed a completely closed system and that in operation the same constant quantity of water will be recirculated, without the loss, drainage or addition of water. The operating temperature and pressure of the water will be effected, as is usual in high temperature systems, by the total quantity of water in the system, as well as by regulation of the back-pressure through adjustment of throttling valve 50.

In a hot water system as herein described, it is necessary that there be provided means which perform the function of an expansion tank. In the reservoir tank, by operation of the automatic controls, the range of the volume of water (or, stated in other terms the water level) between a maximum and minimum will be the same regardless of the water temperature. Hence, in a strict sense the reservoir tank is not an expansion tank, but in operation under fluctuating conditions the adjustment in equilibrium between the steam and water in the tank may produce the same effect as an expansion tank. Actually, in the present system the return tank acts as the expansion tank, in that the expansion of water from a cold to a fired condition is taken up by the return tank. This function of the return tank is the reason for its large size in comparison to the other tanks.

Although other alternative arrangements are described hereafter, it is of interest at this point to note that a probe such as 84 has been found to operate successfully if placed in the line 52, and therefore this probe need not be located in the pumping tank 6.

In connection with the aforedescribed as well as subsequent embodiments, it will be understood that in a high temperature water system appropriate emergency valves, not shown, are provided. Other provisions, particularly important in high temperature water systems, are appropriate expansion loops and couplings, insulation, etc., all of which are well-known and need not be described.

Figure 3:
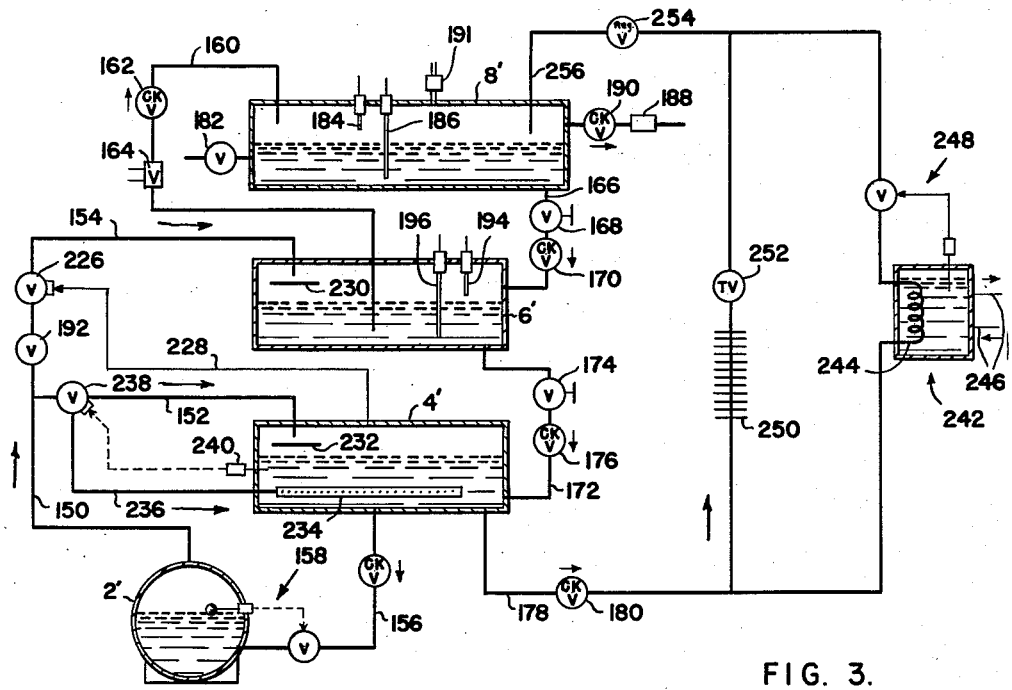
FIGURE 3 is a schematic diagram of a modified system according to the invention.
Figure 4:
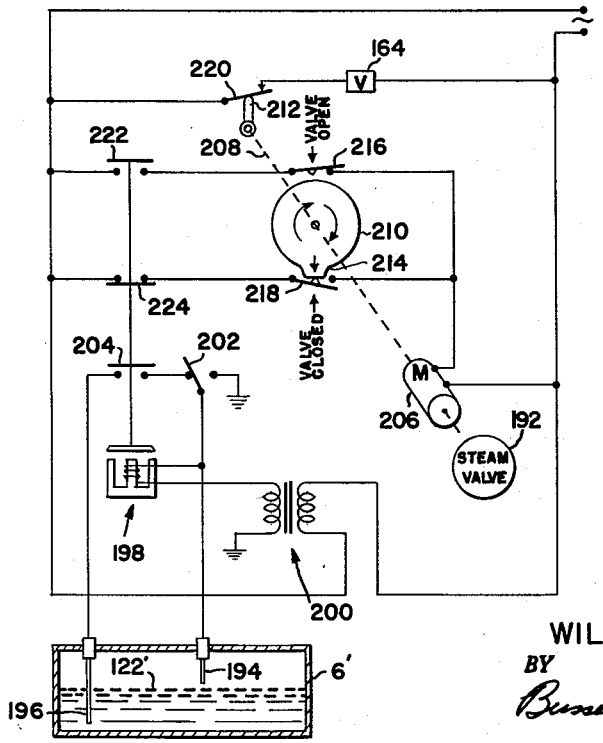
FIGURE 4 is a wiring diagram of the controls provided for the system according to FIGURE 3.

Various alternatives and modifications will now be discussed and particularly described with reference to FIGURES 3 and 4. In my prior application, Serial No. 840,969, it was made clear, for example, that the reservoir tank need not be above the level of the boiler. Ordinarily, a boiler feed pump must be capable of pumping against the high boiler pressure, but in the present case if a reservoir tank is placed at or below the boiler level, since the pressures in the boiler and reservoir tank are equalized by the bleeding of steam to the latter, a small pump may be provided merely to transfer the water from the reservoir tank to the boiler. Similarly, the pumping tank need not be placed above the level of the reservoir tank. If the pumping and reservoir tank are placed side by side, the pressures therein being equalized by the presence of steam in each, a small, low-powered pump is all that is necessary to transfer water from the pumping tank into the reservoir tank. A third possibility is the location of the return tank at or above the level of the pumping tank. Thus, for example, the boiler and the pumping and reservoir tanks may be situated at the boiler room, with the return tank being situated at an upper floor or roof level. In such case, the flow of water from the return tank to the pumping tank is by gravity, and the pumping action of the latter—produced by the condensation of steam therein—is not employed. Referring particularly to FIGURE 3, there are schematically illustrated the boiler 2', reservoir tank 4', pumping tank 6', and return tank 8'. A steam riser 150 extends upwardly from boiler 2' and communicates with the upper spaces of reservoir and pumping tanks 4' and 6', respectively, through branches 152 and 154. Line 156 connects reservoir tank 4' with boiler 2' and the flow of water therein is regulated by the water level controlled valve arrangement 158. Line 160 extends from return tank 8' and dips downwardly into pumping tank 6', check and solenoid valves 162 and 164, respectively, being provided. Water flows downwardly from return tank 8' to pumping tank 6' through a line 166 having throttling and check valves 168 and 170, respectively. Water flows downwardly from pumping tank 6' to reservoir tank 4' through line 172 having throttling and check valves 174 and 176, respectively. Hot water flows to the primary heating circuit from reservoir tank 4' through supply line 178 and check valve 180. Makeup water is supplied to return tank 8' by a high pressure water line having a valve 182 therein which is electrically controlled by a pair of probes 184 and 186 in the same manner as previously described with reference to FIGURE 1. A steam trap 188 and check valve 190 effect the drainage of water from return tank 8' when the level therein rises above a predetermined maximum. An air vent 191 also is provided.

A motorized valve 192 is provided in riser 150 to control the flow of steam to pumping tank 6' and corresponds in function to the valve 32 (FIGURE 1). It has been previously suggested herein that a solenoid operated valve may be satisfactory for small systems wherein the riser 150 is not large. In practice, the operation of a large valve in a conduit carrying high pressure steam requires considerable power and such valves are, therefore, conventionally operated by a motor. Referring then to FIGURE 4 the electrical circuit involving the motorized steam valve 192 will be described. In this case, it will be noted that pumping tank 6' is provided with two probes or electrodes 194 and 196, while reservoir tank 4' is not, as was the case of FIGURE 1, provided with such a probe. A conventional relay of the alternating current type having its coil structure indicated at 198 is adapted to be energized from a transformer 200, the primary of which is connected across an alternating current source. The energization of the relay may be effected either by the closing of a manually operable switch 202 or by the completion of a circuit through probe 194 when the water level 122' is above the lower end of the probe. Also, once the ganged switch 204 has been closed by energization of the relay, such energization will be maintained until the water level 122' falls below probe 196. The above control of the relay is similar to the control described with reference to FIGURE 2 and need not be repeated in detail. The motor for driving steam valve 192 is indicated at 206 and has a shaft schematically indicated at 208 on which are mounted a cam 210 and an arm 212. The lobe of the cam is indicated at 214 and is adapted to open either of a pair of normally closed switches 216 and 218. When the lobe 214 is in the lower position in FIGURE 4 steam valve 192 is closed, and when lobe 214 is in the upper position (rotated 180°), switch 216 then being open, steam valve 192 is open. Also, when steam valve 192 is closed, arm 212 closes a normally open switch 220 to connect the solenoid valve 164 across the alternating current supply. The armature of the relay also operates normally open and normally closed switches 222 and 224, respectively.

Reverting to FIGURE 3, a valve 226 also is provided in riser 150. This valve 226 is a modulating valve which operates in response to pressure variations in reservoir tank 4', the sensing connection being indicated at 228. Valve 226 will tend not to open fully if the steam pressure in reservoir tank 4' has dropped below a desired level, and will open fully if the steam pressure is normal. The reason for the provision of valve 226 is that when valve 192 opens to admit steam to pumping tank 6' the pressure in tank 4' may drop suddenly, causing undesirable effects including flashing in the system, and valve 226 counteracts this tendency by opening only to the extent that the steam pressure in reservoir tank 4' remains above a suitable level. Although two separate valves, 192 and 226, having different functions are provided, a single valve could combine these functions, i.e. it would both modulate steam flow in accordance with the pressure in tank 4' and completely open or close the line (154) to the flow of steam.

The jets of steam emanating from branches 154 and 152 impinge, respectively, on baffles 230 and 232. These baffles prevent the direct impingement of the steam jets on the water and the heat transfer that would result. In the case of pumping tank 6', heat transfer between the steam and water is not intended, the steam there being used solely as a pressurizing medium. In the case of reservoir tank 4' steam emerges, to heat the water, from a perforated pipe 234 that receives steam from a branch 236. Steam is proportioned between branches 152 and 236 by a valve 238 which is electrically controlled in response to a temperature bulb 240 placed beneath the water level in tank 4'. Thus the amount of steam circuited to the perforated pipe 234 will be inversely proportional to the water temperature. It will be evident that perforated pipe 234 is intended as a substitute for the cascade type heat exchanger 14 illustrated in FIGURE 1.

Examples of the uiltization of the high temperature water supplied through line 178 are illustrated. In one instance, a converter 242 is provided for the transfer of heat from the primary heating coil 244 to a secondary water circuit 246. If desired, by proper selection of the converter, steam for processing may be produced in the secondary circuit.

The flow of water through the primary circuit 244 is regulated by a thermostatic arrangement indicated at 248. The hot water is further utilized in a heat exchange device 250, a space heater for example, which is regulated by a thermostatic valve 252. The overall flow through the heating circuit is regulated by a valve 254, which may be of the constant back pressure type or of the constant differential pressure type. In the latter case, the regulating valve 254 will operate in response to the pressure differential between the return connection 256 to the return tank 8' and the supply line 178. The operation of the system shown in FIGURES 3 and 4 will now be briefly described, it being understood that the basic operation principles are in the main the same as previously described in connection with FIGURES 1 and 2. Steam is bled from boiler 2 to the upper space of reservoir tank 4' through branch 152, thereby permitting the flow of water through line 156 to the boiler when called for by the water level control valve arrangement 158. Steam also flows through and out of perforated pipe 234 to heat the water in tank 4', and in a high temperature system the water may be heated almost to its saturation temperature. However, it will be understood that the disclosed system is equally applicable to medium or low temperature operation. Steam also flows through branch 154 to pumping tank 6', effecting the flow of water through line 172 to reservoir tank 4' until the water level in tank 6' falls below probe 196. When tank 6' is thus emptied the probe 196 will cease conducting and relay coil 198 will be deenergized, causing the opening of switches 204 and 222 and the closing of switch 224. At the closing of switch 224 cam lobe 214 is in its upper postion in FIGURE 4, switch 216 thereby being opened and switch 218 being closed. Through closed switches 224 and 218 the motor 206 is activated to slowly drive steam valve 192 to the closed position, upon the completion of which lobe 214 will open switch 218 and thereby turn off motor 206. Also, as steam valve 192 is closed, arm 212 will close switch 220 and thereby energize solenoid valve 164 to open the same. Air and non-condensible gases in tank 6' will escape through riser 160, and steam therein will be throttled to the pressure existing in tank 8'. Water flows downwardly in line 166 to fill tank 6'. When the water level in tank 6' reaches probe 194 relay coil 198 again will be energized, causing switches 222 and 204 to be closed and switch 224 to be opened. A holding circuit will then be established through switch 204 and probe 196. At the closing of switch 222 cam lobe 214 will be at the lower position of FIGURE 4 and switch 216 will be closed, and therefore motor 206 will drive steam valve 192 to an open position. When steam valve 192 reaches the open position cam lobe 214 will open switch 216 to interrupt operation of motor 206 and, in the course of such opening, arm 212 will permit switch 220 to open and thereby effect closing of valve 164. With the opening of steam valve 192, steam again will flow to tank 6' and water will flow therefrom to reservoir tank 4'. This flow of steam through branch 154, however, will be modulated by the pressure controlled valve 226 in accordance with the steam pressure existing in tank 4'. The emptying of tank 6' into tank 4' will continue until the water level in 6' again falls below probe 196. Throughout the aforedescribed cycle of operation, water continuously flows at high pressure from tank 4' and through supply line 178 into the primary heating circuit and returns to return tank 8'.

Reference has been made to certain advantageous aspects of feedwater treatment in a system according to the invention. Such treatment generally includes chemical treatment and deaeration. In conventional heating systems the makeup requirements are high and because this makeup water must be treated before entering the system, special equipment must be provided which is expensive both in initial and operating costs. By way of distinction, however, the systems disclosed herein are completely closed, and therefore the makeup requirements are nonexistent or negligible. In a closed system which requires no makeup water, the water in the system need be deaerated and chemically treated, for example for softening, only once, and thereafter such problems may cease to exist. The chemical treatment in the closed system may be carried out as discussed in said application 840,969 to which reference may be had. Briefly, this involves the use of one of the tanks to collect sludge, precipitates, etc. Also, chemical agents are introduced at this one tank as explained in said application. As to deaeration, this is effected each time water and steam are mixed in the pumping tank (and also in the reservoir tank), and the air escapes through the special vents provided. After a system has been in operation for a period of time, all of the air will have been removed by successive cycles of operation involving mixing of steam and water.

Throughout the above description reference has been made to systems wherein water is employed as the circulating medium. However, it should be understood that the invention is equally applicable to systems employing mercury, dowtherm or ammonia, which as to the principles applicable hereto are considered the equivalents of water.

It will be understood that various departures can be made from the specifically disclosed embodiments of the invention without departing from the scope of the invention as defined by the following claims.

What is claimed is:

1. A hot water system comprising a closed tank having a drain for the flow of water therefrom to a boiler, a heating circuit, a supply line leading from said tank to said circuit and adapted to supply hot water thereto, a second closed tank having a discharge line for the flow of water to the first-mentioned tank, said second tank being elevated with respect to said first-mentioned tank in a position to permit gravity flow of liquid from the second to the first tank, means for bleeding steam from a source to said first-mentioned tank and discharging the steam in heat exchange contact with the water to heat the same, means for bleeding steam from a source to said second tank to thereby effect supply of water therefrom to the first-mentioned tank, a return tank, a return line leading from said circuit to said return tank, a conduit connecting said return and second tanks for the delivery of water from the former to the latter, means for condensing steam in said second tank to lower the pressure therein and thereby draw water from said return tank, and control means effecting alternate operation of the means for bleeding steam to the second tank and the means for condensing steam therein, valve means being provided in said discharge line to prevent flow therein in the direction from the first-mentioned to the second tank during operation of said condensing means.

2. A system according to claim 1, wherein said condensing means comprises means for pumping a quantity of water into said second tank.

3. A system according to claim 1, wherein said means for bleeding steam to the first-mentioned tank comprises first means for introducing steam above the water level of the first-mentioned tank, second means for introducing steam below said water level, and means responsive to the water temperature in the first-mentioned tank and proportioning the amount of steam introduced by said respective first and second means in accordance with said temperature.

4. A system according to claim 3, wherein said second tank is located above the level of the first-mentioned tank.

5. A system according to claim 1, wherein said means for bleeding steam to the first-mentioned tank includes a cascade type heat exchanger, conduit means for the flow of water from said second tank to said heat exchanger.

6. A hot water system comprising a closed tank having a drain for the flow of water therefrom to a boiler, a heating circuit, a supply line leading from said tank to said circuit and adapted to supply hot water thereto, a second closed tank elevated with respect to said first-mentioned tank in a position to permit gravity flow of liquid from the second tank to the first tank, a line connecting the second tank and first-mentioned tank for the flow of water from the former to the latter, means for supplying steam at a given pressure to the first-mentioned tank, means for discharging steam thus supplied by the last-mentioned means into the first-mentioned tank in heat exchange relationship with water therein, whereby the water is heated by the steam, a return tank located above the level of said second tank, a return line leading from said circuit to said return tank, the pressure in said return tank being lower than said given pressure whereby water is circulated through said circuit, a discharge line connecting said return and second tanks for the flow of water by gravity from the former to the latter, means for intermittently bleeding steam from a source to the said second tank, and valve means in said discharge line preventing flow therein in the direction from the second tank to the return tank during said bleeding of steam to the second tank.

7. A system according to claim 6, including means for venting steam and other gases from the second tank to lower the pressure therein, and control means for the last-mentioned means and the means for bleeding steam to the second tank effecting alternate operation thereof.

8. A system according to claim 7, wherein said venting means is connected between said second and return tanks for venting to the latter tank.

9. A system according to claim 6, including valve means in the first-mentioned line and preventing flow therein in the direction from the first-mentioned tank to the second tank.

10. A hot water system comprising a closed tank having a drain for the flow of water therefrom to a boiler, a heating circuit, a supply line leading from said tank to said circuit and adapted to supply hot water thereto, a second closed tank positioned above the level of the first-mentioned tank and having a discharge line connected to the first-mentioned tank for the flow of water therefrom to the first-mentioned tank, a return tank connected to said circuit and receiving the water returning therefrom, means for bleeding steam from said boiler to said second tank, means for condensing steam in said second tank, control means for the respective means for bleeding steam to and condensing steam in said second tank and effecting alternate operation of the same, a conduit for the passage of water from the return tank to the second tank upon the drop in pressure in the latter tank by virtue of condensing steam therein, means for bleeding steam from said boiler to the first-mentioned tank to heat water therein delivered from said second tank, and means preventing flow in said discharge line in a direction between said first tank and said second tank during the passage of water to said second tank.

11. A system according to claim 10, including means for the turbulent mixing of steam and water in said first-mentioned tank.

12. A system according to claim 10, including a heat exchanger in said first-mentioned tank, said means for bleeding steam to said first tank being connected to said heat exchanger for delivering steam thereto, said discharge line to the first tank including a first conduit connected to said heat exchanger for delivering water thereto in heat exchange relationship with the steam delivered thereto.

13. A system according to claim 12, wherein said discharge line includes a second conduit connected to said first tank for by-passing water flow past said heat exchanger to said first tank.

14. A system according to claim 13, including means responsive to the water temperature in the first-mentioned tank for controlling flow through said bypass conduit, the quantity of water bypassed away from said heat exchanger being varied inversely with changes in said temperature.

15. A system according to claim 10, wherein said condensing means comprises a tank having communication with said conduit means preventing flow in said conduit in the direction from the condensing tank to said return tank, and means for bleeding steam from a source thereof to said condensing tank.

16. A system according to claim 10, wherein said control means is responsive to the emptying of said second tank below a predetermined level to initiate the operation of said condensing means and to interrupt operation of said means for bleeding steam to the second tank.

17. A system according to claim 16, wherein said control means is responsive to the filling of said second tank with water above a predetermined level to resume operation of said means for bleeding steam to the second tank.

18. A system according to claim 10, wherein said control means is responsive to the emptying of both the second tank and the first-mentioned tank below respective predetermined levels to initiate operation of said condensing means and to interrupt operation of said means for bleeding steam to the second tank.

19. In combination with a heating circuit including heat exchange means therein and having inlet and outlet connections, a system for heating liquid and forcing the same through said circuit comprising a first closed tank having a discharge line connected to said inlet connection for the flow of liquid to said circuit, a second closed tank elevated with respect to said first tank in a position to permit gravity flow of liquid from the former to the latter, means providing a conduit between said first and second tanks to accommodate said gravity flow, a source of heated vapor, means for bleeding vapor from said source to said first tank at a sufficient pressure to effect the flow of liquid therefrom through said discharge line and the said circuit, a receiver connected to said circuit outlet connection to receive liquid returned from said circuit, means alternately bleeding vapor from said source to said second tank and replenishing said second tank with liquid from said receiver in response to the liquid level on said second tank, the bleeding of steam to said second tank effecting the flow of liquid therefrom to said first tank, and means preventing reverse flow in said conduit from said first to said second tank during said filling of the latter.

20. The combination according to claim 19, including heat exchange means in said first tank for mixing vapor and liquid therein in heat exchange relation.

21. The combination according to claim 19, wherein said source of vapor comprises a boiler, said first tank being elevated relative to said boiler in a position to permit gravity flow of liquid from the first tank to the boiler, and including a drain connected between said first tank and said boiler to accommodate the gravity flow therebetween.

22. The combination according to claim 19, wherein said receiver is elevated relative to said second tank to permit the gravity flow of liquid from the receiver to the second tank.

23. In combination with a heating circuit including heat exchange means therein and having inlet and outlet connections, a system for heating liquid and forcing the same through said circuit comprising a first closed tank having a discharge line connected to said inlet connection for the flow of liquid to said circuit, a second closed tank elevated with respect to said first tank in a position to permit gravity flow of liquid from the former to the latter, means providing a conduit between said first and second tanks to accommodate said gravity flow, a source of heated vapor, means for bleeding vapor from said source to said first tank at a sufficient pressure to effect the flow of liquid therefrom through said discharge line and the said circuit, a receiver connected to said circuit outlet connection to receive liquid returned from said circuit, said receiver being elevated with respect to said second tank in a position to permit gravity flow of liquid from said receiver to said second tank, means providing a conduit between said receiver and second tank to accommodate the last-mentioned gravity flow of liquid, means intermittently bleeding vapor from said source to said second tank, whereby the bleeding of vapor to said second tank effects the flow of liquid therefrom to said first tank and the temporary interruption of the bleeding of vapor permits the gravity flow of liquid from said receiver to fill said second tank, and means preventing reverse flow in the first-mentioned conduit from said first to said second tank during said filling of the latter.

24. In combination with a heating circuit including heat exchange means therein and having inlet and outlet connections, a system for heating liquid and forcing the same through said circuit comprising a first closed tank having a discharge line connected to said inlet connection for the flow of liquid to said circuit, a second closed tank elevated with respect to said first tank in a position to permit gravity flow of liquid from the former to the latter, means providing a conduit between said first and second tanks to accommodate said gravity flow, a boiler providing a source of vapor, said first tank being elevated relative to said boiler in a position to permit gravity flow from the first tank to the boiler and having a drain connected to the boiler to accommodate gravity flow, means for bleeding vapor from said boiler to said first tank, heat exchange means receiving vapor thus bled to said first tank and effecting the heating of liquid supplied thereto from said second tank, the vapor bled to said first tank being at a sufficient pressure to effect the flow of liquid therefrom through said discharge line and said circuit, a receiver connected to said circuit outlet connection to receive liquid returned from said circuit, said receiver being at a lower pressure than said vapor pressure and being elevated with respect to said second tank in a position to permit gravity flow of liquid from said receiver to said second tank, means providing a conduit between said receiver and second tank to accommodate the last-mentioned gravity flow of liquid, means intermittently bleeding steam from said boiler to said second tank, whereby the bleeding of steam to said second tank effects the flow of liquid therefrom to said first tank and the temporary interruption of the bleeding of steam permits the gravity flow of liquid from said receiver to fill said second task, and means preventing reverse flow in the first-mentioned conduit from said first to said second tank during said filling of the latter.

25. In combination with a heating circuit including heat exchange means therein and having inlet and outlet connections, a system for heating liquid and forcing the same through said circuit comprising a first closed tank having a discharge line connected to said inlet connection for the flow of liquid to said circuit, a second closed tank elevated with respect to said first tank in a position to permit gravity flow of liquid from the former to the latter, means providing a conduit between said first and second tanks to accommodate said gravity flow, a source of heated vapor, means for bleeding vapor from said source to said first tank at a sufficient pressure to effect the flow of liquid therefrom through said discharge line and the said circuit, means including heat exchange means for heating the liquid in said first tank, a receiver connected to said circuit outlet connection to receive liquid returned from said circuit, said receiver being elevated with respect to said second tank in a position to permit gravity flow of liquid from said receiver to said second tank, means providing a conduit between said receiver and second tank to accommodate the last-mentioned gravity flow of liquid, means intermittently bleeding steam from said source to said second tank, whereby the bleeding of steam to said second tank effects the flow of liquid therefrom to said first tank and the temporary interruption of the bleeding of steam permits the gravity flow of liquid from said receiver to fill said second tank, and means preventing reverse flow in the first-mentioned conduit from said first to said second tank during said filling of the latter.

26. A hot water system comprising a closed tank having a drain for the flow of water therefrom to a boiler, a heating circuit, a supply line leading from said tank to said circuit and adapted to supply hot water thereto, means supplying steam to said first-mentioned tank at a given pressure and in heat exchange relationship with water therein, a second closed tank having a discharge line connected to the first-mentioned tank for the flow of water to the first-mentioned tank, said second tank being elevated with respect to said first-mentioned tank in a position to permit gravity flow of liquid from the second tank to the first tank, means for alternately filling said second tank with water and for supplying steam thereto at the same pressure as the steam supplied to said first tank, and means preventing flow in said discharge line in a direction between the first tank and the second tank during said filling of said second tank.

27. A hot water system comprising a closed tank having a drain for the flow of water therefrom to a boiler, a heating circuit, a supply line leading from said tank to said circuit and adapted to continuously supply hot water thereto, a heat exchanger in said tank, means supplying steam to said first-mentioned tank at a given pressure and to said heat exchanger, a second closed tank having a discharge line for the flow of water to the first-mentioned tank, said second tank being elevated with respect to said first-mentioned tank in a position to permit gravity flow of liquid from the second tank to the first tank, means for alternately filling said second tank with water and for supplying steam thereto at the same pressure as the steam supplied to said first tank, and valve means in said discharge line preventing flow in a direction between the first tank and the second tank during said filling of said second tank.

References Cited in the file of this patent

UNITED STATES PATENTS

| | | |
|---|---|---|
| 993,926 | Wassiliew | May 30, 1911 |
| 998,142 | Whitney | July 18, 1911 |
| 1,867,143 | Fohl | July 12, 1932 |
| 2,325,241 | Gilmore | July 27, 1943 |
| 2,639,675 | Williams | May 26, 1953 |
| 2,870,751 | Kuljian | Jan. 27, 1959 |

OTHER REFERENCES

"Hot-Water Systems," The Industrial Heating Engineer, February, 1958, pages 35 to 40, pages 39 and 40 relied on.